(12) United States Patent
Kim

(10) Patent No.: US 10,541,834 B2
(45) Date of Patent: Jan. 21, 2020

(54) APPARATUS AND METHOD OF CONTROLLING OPERATION OF SLAVE CONTROLLER

(71) Applicant: HYUNDAI AUTRON CO., LTD., Seongnam-si (KR)

(72) Inventor: Dae-Hyun Kim, Seoul (KR)

(73) Assignee: Hyundai Autron Co., Ltd., Seoul (KR)

( * ) Notice: Subject to any disclaimer, the term of this patent is extended or adjusted under 35 U.S.C. 154(b) by 119 days.

(21) Appl. No.: 15/827,799

(22) Filed: Nov. 30, 2017

(65) Prior Publication Data

US 2018/0159698 A1 Jun. 7, 2018

(30) Foreign Application Priority Data

Dec. 6, 2016 (KR) .................. 10-2016-0164827

(51) Int. Cl.
*H04L 12/403* (2006.01)
*H04L 12/40* (2006.01)
*G05B 15/02* (2006.01)
*G06F 13/10* (2006.01)
(Continued)

(52) U.S. Cl.
CPC ......... *H04L 12/403* (2013.01); *B60W 50/045* (2013.01); *G05B 15/02* (2013.01); *G06F 13/102* (2013.01); *H04L 12/40013* (2013.01); *H04L 29/02* (2013.01); *H04L 2012/40234* (2013.01)

(58) Field of Classification Search
CPC . H04L 2012/40273; H04L 2012/40215; H04L 12/40013; H04L 12/403; H04L 2012/40234; H04L 29/02
See application file for complete search history.

(56) References Cited

U.S. PATENT DOCUMENTS

2008/0082178 A1* 4/2008 Schroff ................. H04L 12/403
700/3
2015/0350750 A1* 12/2015 Yun .......................... H04Q 9/00
340/870.07
(Continued)

FOREIGN PATENT DOCUMENTS

KR 10-2014-0061043 A 5/2014
KR 10-2015-0136336 A 12/2015

OTHER PUBLICATIONS

Ralf Schwering, LIN (Local Interconnected Network), Fundamentals of the LIN Protocol, Software Development Engineer Vector Informatik GmbH, V1.0, Dec. 3, 2004.

*Primary Examiner* — Mewale A Ambaye
(74) *Attorney, Agent, or Firm* — Baker & Hostetler LLP; Hyunho Park

(57) ABSTRACT

An apparatus for controlling operations of one or more slave controllers connected via a LIN communication includes a controller configured to generate a control message to control the operations of the one or more slave controllers and a status request message to request status information of the one or more slave controllers, a transmitter configured to transmit the control message and the status request message to the slave controllers, and a receiver configured to receive a response message from a response slave controller when the response slave controller included in the one or more slave controllers generates the response message including status information thereof by referring to the control message and status request message.

10 Claims, 7 Drawing Sheets

(51) Int. Cl.
    *B60W 50/04*     (2006.01)
    *H04L 29/02*     (2006.01)

(56) References Cited

U.S. PATENT DOCUMENTS

2017/0359195 A1* 12/2017 Bender ............. H04L 12/40006
2019/0126859 A1*  5/2019 Parmar ................ B60R 16/023

* cited by examiner

APPARATUS AND METHOD OF CONTROLLING OPERATION OF SLAVE CONTROLLER

CROSS-REFERENCE TO RELATED APPLICATIONS

This application claims the benefit of Korean Patent Application No. 10-2016-0164827, filed on Dec. 6, 2016, entitled "APPARATUS AND METHOD FOR CONTROLLING OPERATION OF SLAVE CONTROLLER", which is hereby incorporated by reference in its entirety into this application.

BACKGROUND

1. Technical Field

The present disclosure relates to an apparatus and method of controlling an operation of a slave controller, and more particularly, to an apparatus and method of controlling operations of one or more slave controllers and simultaneously receiving status information of each slave controller, by using a local interconnect network (LIN) communication.

2. Description of the Related Art

In recent years, as digital technology has been introduced to most vehicles and the number of electronic products mounted on the vehicle has greatly increased, a need to control a vehicle system in consideration of many internal and external variables of a vehicle has risen. Accordingly, an electronic control unit (ECU) for a vehicle is used to control not only the function of an engine, but also all parts of the vehicle such as a driving system and a steering system.

Furthermore, recently, an active air flap (AAF) is being developed as an active actuator. The AAF includes a plurality of flaps that are opened and closed between a radiator grill and a radiator of a vehicle, and controls the temperature and air resistance of the vehicle by opening and closing each flap according to a driving condition of the vehicle. In order to control such an active actuator, data communication is required between the ECU and the active actuator of the vehicle.

A local interconnect network (LIN) communication, which is one of the typical communication methods, is a standard communication protocol for transmitting data according to a time schedule, in which data communication is performed through a single LIN bus connecting a master controller and one or more slave controllers. In the LIN communication, the above-described ECU and active actuator of the vehicle function as a master controller and a slave controller, respectively.

However, when using the LIN communication, if messages controlling the operations of the respective slave controllers are different from one another, there is a problem in that the time schedule needs to be changed according to the addition or change of a slave controller. Also, in the case of the above-described AAF, a plurality of flaps are simultaneously controlled. In this state, if the messages for controlling the operations of the respective flaps are different from one another, it is a problem that the AAF cannot be simultaneously controlled due to a time difference according to the time schedule.

In addition, when the master controller requests status information of one or more slave controllers through a single LIN bus, there is a problem in that responses generated by a plurality of slave controllers collides with one another, resulting in a communication failure.

Therefore, there is a demand for a method capable of solving the above problems in the LIN communication, and simultaneously controlling the operations of the slave controllers and receiving status information from the slave controllers.

SUMMARY

It is an object of the present disclosure to provide an apparatus and method of controlling operations of one or more slave controllers, wherein the operations of one or more slave controllers connected via a local interconnect network (LIN) communication may be simultaneously controlled by transmitting a single control message to control the operations of the slave controllers.

Furthermore, it is another object of the present disclosure to provide an apparatus and method of controlling operations of one or more slave controllers, wherein status information of the slave controllers may be selectively received by receiving a response message from a response slave controller corresponding to controller identification data included in the control message.

Furthermore, it is another object of the present disclosure to provide an apparatus and method of controlling operations of one or more slave controllers, wherein collision of responses of the slave controllers may be prevented by sequentially receiving response messages from the respective slave controllers.

Furthermore, it is another object of the present disclosure to provide an apparatus and method of controlling operations of one or more slave controllers, wherein the status of the slave controllers may be continuously monitored by repeating the receiving of a response message with respect to each slave controller when the response messages from all slave controllers are received.

Objects of the present disclosure are not limited to the above-described objects and other objects and advantages can be appreciated by those skilled in the art from the following descriptions. Further, it will be easily appreciated that the objects and advantages of the present disclosure can be practiced by means recited in the appended claims and a combination thereof.

In accordance with one aspect of the present disclosure, an apparatus for controlling operations of one or more slave controllers connected via the LIN communication includes: a controller configured to generate a control message to control the operations of the one or more slave controllers and a status request message to request status information of the one or more slave controllers; a transmitter configured to transmit the control message and the status request message to the slave controllers; and a receiver configured to receive a response message from a response slave controller when the response slave controller included in the one or more slave controllers generates the response message including status information thereof by referring to the control message and status request message.

In accordance with one aspect of the present disclosure, a method of controlling operations of the one or more slave controllers connected via the LIN communication includes: generating a control message to control the operations of the one or more slave controllers and a status request message to request status information of the one or more slave controllers; transmitting the control message and the status request message to the one or more slave controllers; and receiving a response message from a response slave controller when the response slave controller included in the one or more slave controllers generates the response message including status information thereof by referring to the control message and status request message.

DETAILED DESCRIPTION

Figure 1:
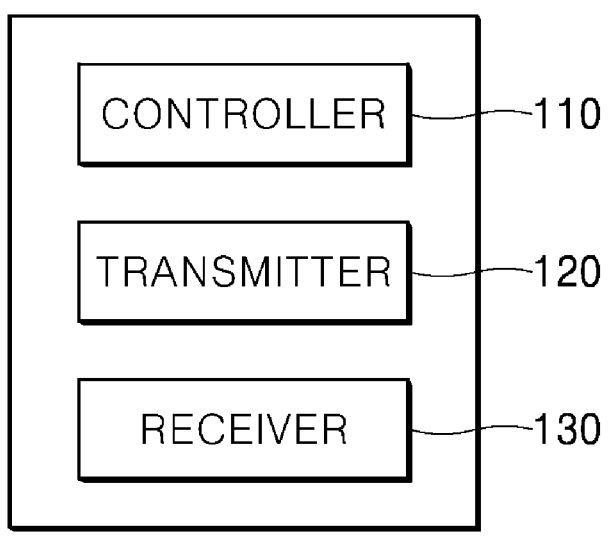
FIG. 1 is a block diagram of an apparatus for controlling an operation of a slave controller, according to an embodiment of the present disclosure.

The above objects, features and advantages will become apparent from the detailed description with reference to the accompanying drawings. Embodiments are described in sufficient detail to enable those skilled in the art in the art to easily practice the technical idea of the present disclosure. Detailed descriptions of well known functions or configurations may be omitted in order not to unnecessarily obscure the gist of the present disclosure. Hereinafter, embodiments of the present disclosure will be described in detail with reference to the accompanying drawings. Throughout the drawings, like reference numerals refer to like elements.

FIG. 1 is a block diagram of an apparatus 100 for controlling an operation of a slave controller, according to an embodiment of the present disclosure. Referring to FIG. 1, the apparatus 100 for controlling an operation of a slave controller according to the present embodiment of the present disclosure may include a controller 110, a transmitter 120, and a receiver 130. The apparatus 100 for controlling an operation of a slave controller illustrated in FIG. 1 is according to an embodiment, and the constituent elements thereof are not limited to the embodiment illustrated in FIG. 1 and some constituent elements may be added, modified, or deleted as necessary.

Figure 2:
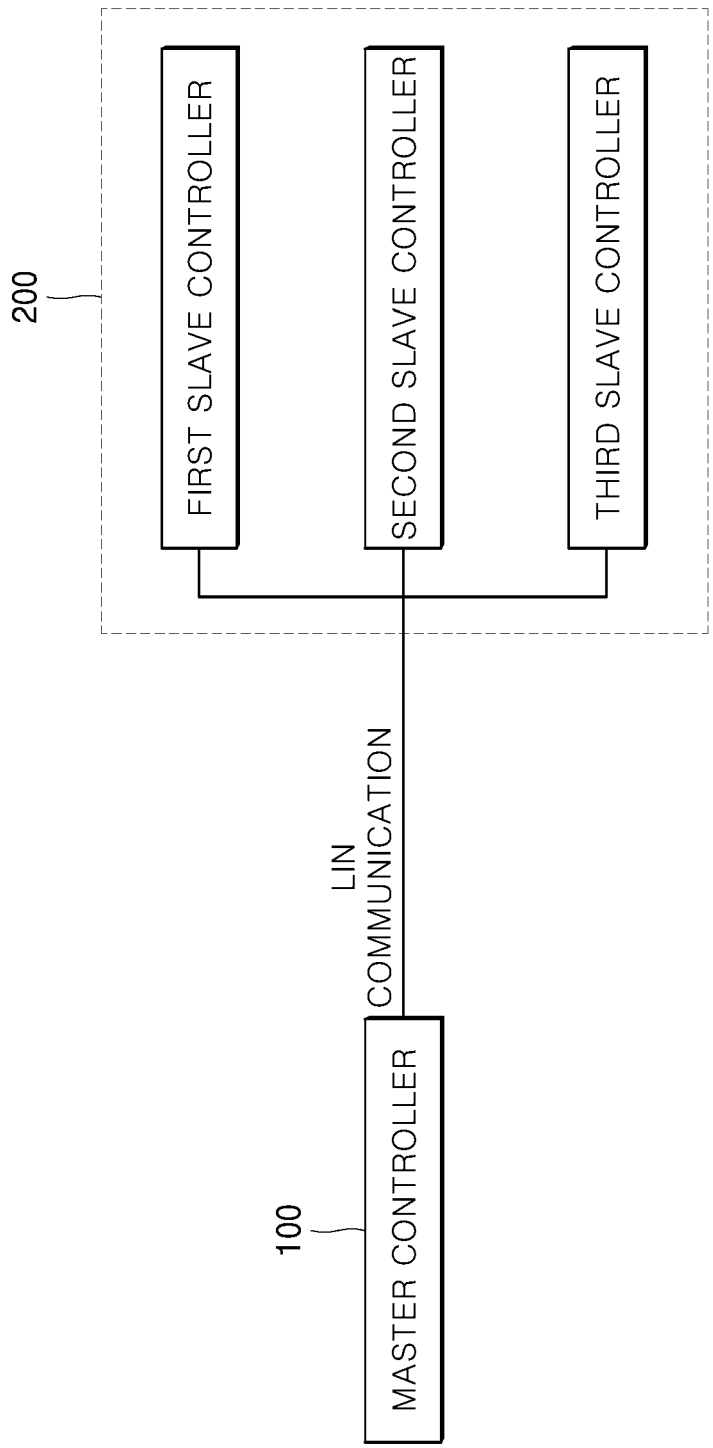
FIG. 2 illustrates an embodiment in which a master controller is connected to a slave controller via a local interconnect network (LIN) communication.

FIG. 2 illustrates an embodiment in which a master controller 100 is connected to a slave controller 200 via a local interconnect network (LIN) communication. The apparatus 100 for controlling the operations of one or more slave controllers connected via the LIN communication is described below in detail with reference to FIGS. 1 and 2.

Referring to FIG. 2, the LIN communication is a local interconnect network, and data communication is performed through a single LIN bus that connects the master controller 100 and one or more slave controllers 200. The LIN communication may be used for data transmission between an electronic control unit (ECU) and an active sensor or active actuator used for a vehicle.

The ECU may correspond to the master controller 100, and the active sensor or active actuator may correspond to the slave controller 200. In detail, the apparatus 100 for controlling an operation of a slave controller according to the present disclosure may include the master controller 100 illustrated in FIG. 2. Furthermore, in the present disclosure, the slave controller 200 may include an active air flap (AAF) actuator.

The AAF actuator is a controller for controlling the temperature and air resistance of a vehicle by opening and closing a plurality of flaps that is opened and closed between a radiator grill and a radiator of a vehicle, according to a driving condition of the vehicle.

The apparatus 100 for controlling an operation of a slave controller according to the present disclosure may be the master controller 100 that controls the operations of the slave controllers 200 connected via the LIN communication and monitors the slave controllers 200 by receiving status information of the slave controller 200.

In the following description, the apparatus 100 for controlling an operation of a slave controller according to the present disclosure is referred to as the master controller 100, and among the slave controllers 200, a slave controller that transmits status information to the master controller 100 is referred to as a response slave controller.

The status information of a slave controller may include information about a current operation state of a slave controller. For example, when the slave controller is the above-described AAF actuator, the status information may include information about an opening/closing state of a flap that the AAF actuator controls.

Figure 3:
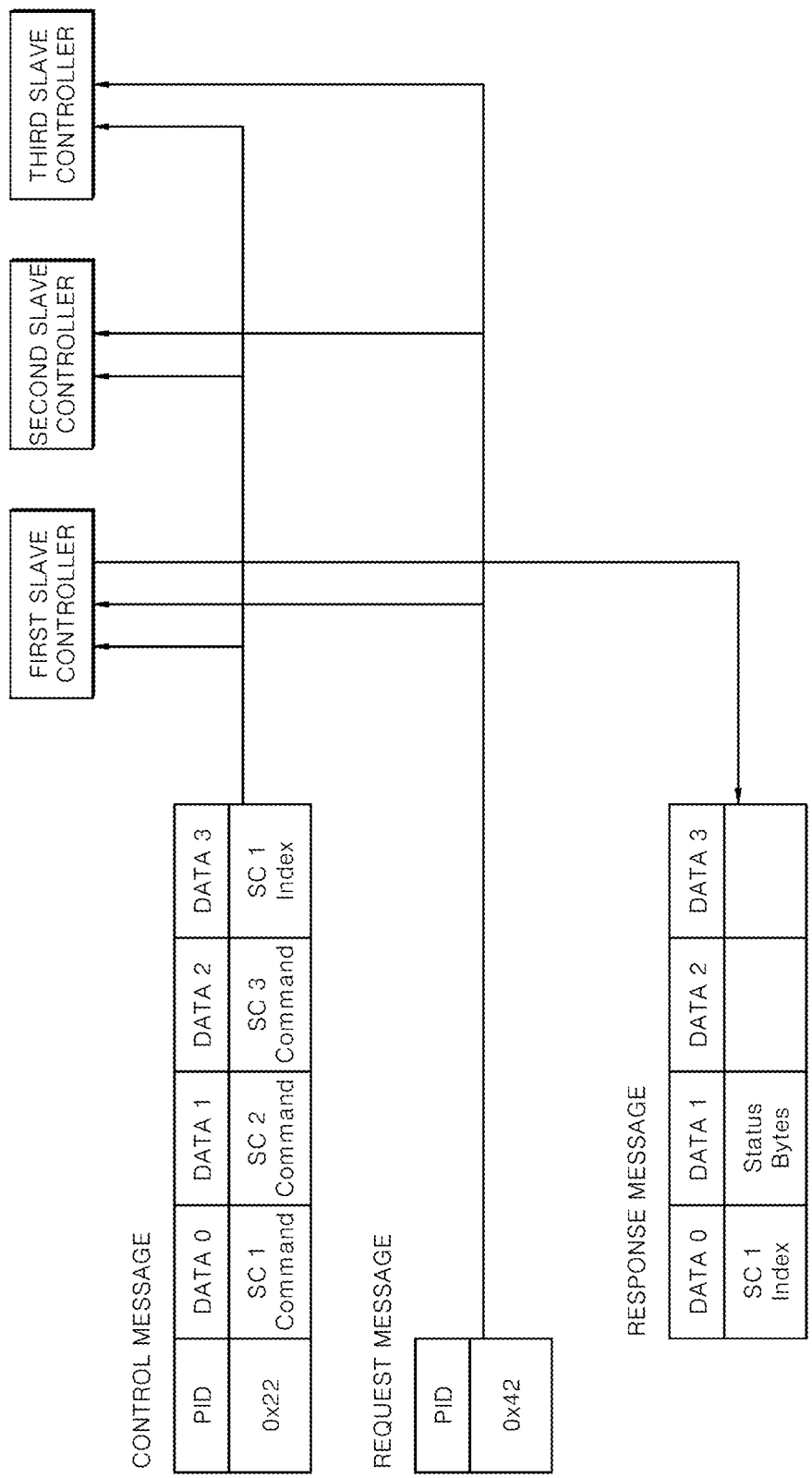
FIG. 3 illustrates an embodiment of a control message and a status request message transmitted to a slave controller and a response message received from the slave controller.

FIG. 3 illustrates an embodiment of a control message and a status request message transmitted to the slave controller 200 and a response message received from the slave controller 200. The controller 110, the transmitter 120, and the receiver 130 constituting the apparatus 100 for controlling an operation of a slave controller according to the present disclosure are described below in detail with reference to FIGS. 1 to 3.

Referring to FIG. 3, the controller 110 according to an embodiment of the present disclosure may generate a control message to control the operations of the slave controllers 200. The control message may include header frame data and response frame data generated by the master controller 100.

The header frame data may include a message identifier PID of the control message, and the response frame data may include control commands to the respective slave controllers and controller identification data of a response slave controller.

In detail, the control message may include a header frame and a response frame. The header frame of the control message may include information about the message identifier PID that defines the content of the message. The message identifier may be generated by a LIN communication module (not shown), and the LIN communication module may be included in the master controller 100.

For example, the control message may be a message that does not request a response from the slave controller 200. When the control message is transmitted to the slave controller 200, the slave controller 200 may check that the message is a message that does not request a response, by referring to the message identifier PID of the control message.

The response frame of the control message may include data DATA 0, DATA 1, and DATA 2 for controlling each of the slave controllers 200. In detail, the response frames of DATA 0, DATA 1 and DATA 2 illustrated in FIG. 3 may include control commands to a first slave controller SC 1, a second slave controller SC 2, and a third slave controller SC 3.

Furthermore, the response frame of the control message may include the controller identification data of the response slave controller. In detail, the response frame of the control message may include an index field to assign a corresponding response slave controller. For example, when the response slave controller is the first slave controller SC 1, the index field of DATA 3 included in the response frame may include controller identification data of the first slave controller SC 1 (SC 1 Index).

In other words, to control the operations of the slave controllers 200 at once, the master controller 100 of the present disclosure may generate the control message including a control command to each of the slave controllers 200 and a single message identifier PID.

In other words, in the present disclosure using the LIN communication, the control message is a message to transmit commands to the slave controllers 200, which does not request a response from the slave controller 200. Accordingly, the data of the header frame and the response frame constituting the control message may be all generated by the master controller 100. The control message may be generated according to a full frame structure used in the LIN communication.

As described above, according to the present disclosure, since a single control message to control the operations of the slave controllers 200 connected via the LIN communication is transmitted, the operations of the slave controllers 200 may be simultaneously controlled.

Referring back to FIG. 3, the controller 110 according to an embodiment of the present disclosure may generate a status request message to request the status information of the slave controller 200. The status request message may include the header frame, and the header frame may include the message header data generated by the master controller 100.

In detail, the message header data included in the status request message may include the message identifier PID of the status request message. The message identifier may be generated by the LIN communication module, and the LIN communication module may be included in the master controller 100, as described above.

For example, the status request message may be a message that requests a response from the slave controller 200. When the status request message is transmitted to the slave controller 20, the slave controller 200 may check that the received message is a message that requests a response status, by referring to the message identifier PID of the request message.

In other words, in the present disclosure using the LIN communication, the status request message is a message to receive data from the slave controller 200, which requests a response from the slave controller 200. Accordingly, when the master controller 100 transmits the header frame only to the slave controller 200, as described below, the slave controller 200 may generate a response frame corresponding to the header frame. The status request message as above may be generated according to a header response method used in the LIN communication.

The transmitter 120 according to an embodiment of the present disclosure may transmit the control message and the status request message generated in the above method to the slave controllers 200. The transmitter 120 included in the master controller 100 may transmit the control message and the status request message according to a preset time schedule for the LIN communication.

In detail, after transmitting the control message, the transmitter 120 may transmit the status request message. For example, the transmitter 120 may transmit the control message during 0 ms to 10 ms, and the status request message during 10 ms to 20 ms. Accordingly, the control message and the status request message may be simultaneously transmitted to each of the slave controllers 200 through one-time time scheduling.

Referring back to FIG. 3, the slave controllers 200 may receive the control message from the master controller 100. The slave controllers 200 may be simultaneously operated according to the control command to each of the slave controllers 200.

In detail, as described above, the transmitter 120 may transmit control messages to all of the slave controllers 200 through one-time transmission. Accordingly, the respective slave controllers 200 receiving the control message may simultaneously receive the control commands included in the control message and simultaneously perform operations according to the control commands.

Furthermore, a response slave controller included in each of the slave controllers 200 may generate a response message including status information thereof, by referring to the control message and the status request message. In detail, the slave controllers 200 receiving the status request message may check that the status request message is a message to request a response, by referring to the message identifier PID of the status request message.

At this time, the response slave controller may check that the response slave controller is the one who responds to the status request message, by referring to the controller identification data included in the control message.

In other words, each of the slave controllers 200 receiving the control message may activate the LIN communication when the controller identification data included in the index field is the same as the controller identification data thereof, by referring to the index field of the control message. In other words, the controller identification data included in the control message may be data to determine the slave controller to respond to the status request message.

Referring back to FIG. 3, the master controller 100 may previously assign a slave controller to respond to the request data, by including the controller identification data of the first slave controller SC1 (SC 1 Index) in the index field of the control message DATA 3.

The first slave controller SC1 may check that the controller identification data of the first slave controller (SC 1 Index) included in the control message is the same as the identification information thereof. Accordingly, the first slave controller may activate the LIN communication, and may generate a response message including status information thereof (Status Bytes) in response to the request data. In detail, the response message may include the response frame data generated by the response slave controller.

Referring back to FIG. 3, the response frame data DATA 0, DATA 1, DATA 2, and DATA 3 of the response message may include the controller identification data (SC 1 Index) and the status information (Status Bytes) of the response slave controller.

In other words, the response slave controller may generate the response message (SC 1 Index and Status Bytes) corresponding to the status request message received from the master controller 100.

The receiver 130 according to an embodiment of the present disclosure may receive the response message generated by the above method, from the response slave controller. Accordingly, the master controller 100 may monitor the slave controllers 200 by storing and managing the controller identification data and the status information included in the response message.

As described above, according to the present disclosure, since the response message is received from the response slave controller corresponding to the controller identification data included in the control message, the status information of a slave controller may be selectively received.

Figure 4:
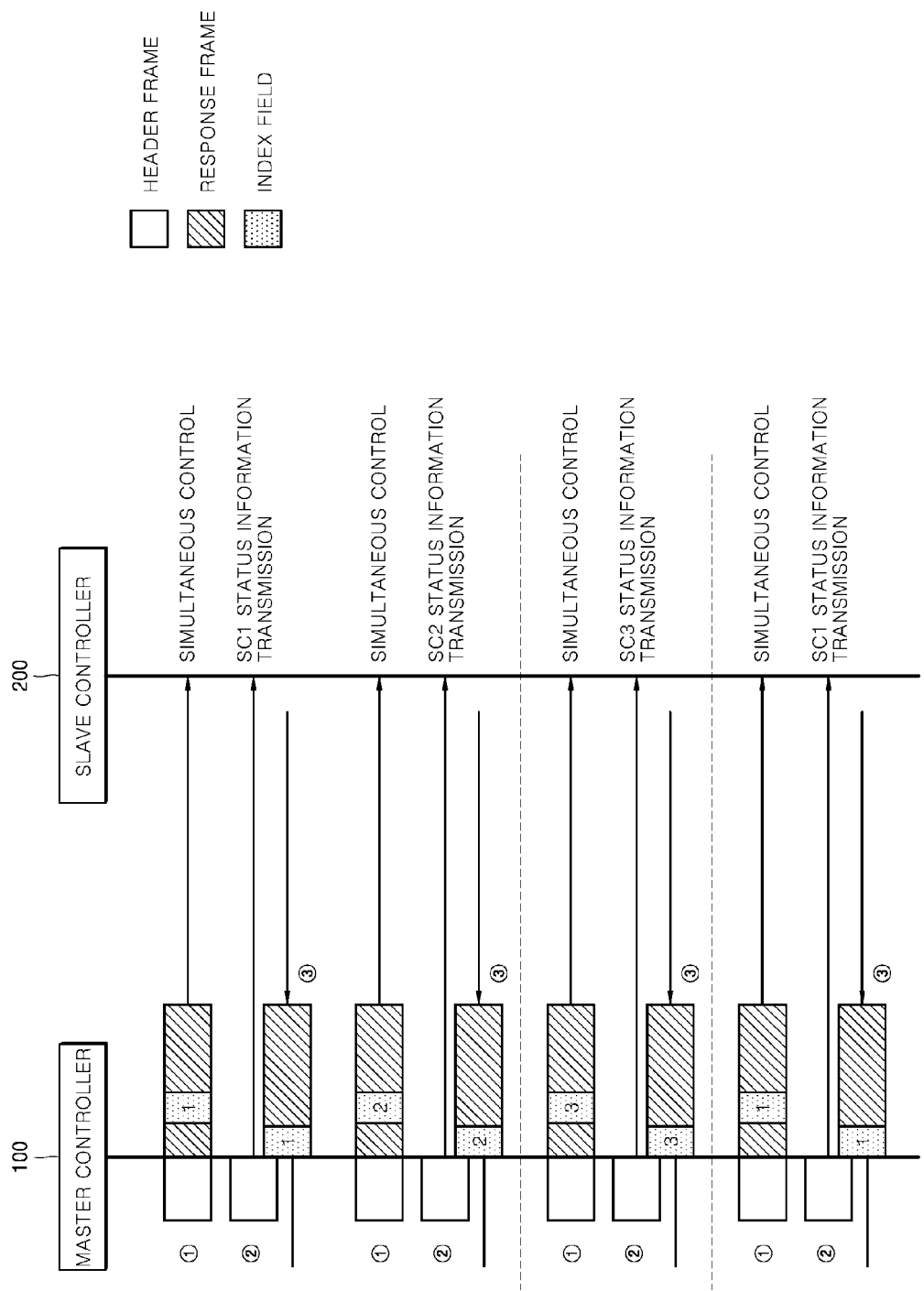
FIG. 4 illustrates an embodiment in which the master controller sequentially receives status information about the slave controller.

FIG. 4 illustrates an embodiment in which the master controller 100 sequentially receives status information about the slave controller 200. A process in which the master controller 100 sequentially receives status information about the slave controllers 200 is described below in detail with reference to FIG. 4.

When the receiver 130 receives a response message, the controller 110 according to the present embodiment of the present disclosure may generate a control message including the controller identification data of a response slave controller different from the response slave controller that transmitted the response message, among the slave controllers 200.

Referring to FIG. 4, the master controller 100 may transmit, as described in FIG. 3, a control message (①) including controller identification data (1) of the first slave controller in the index field, to each of the slave controllers 200. Furthermore, the master controller 100 may transmit a status request message (②) requesting status information of a slave controller to each of the slave controllers 200.

The first slave controller may transmit a response message (③) including the controller identification data (1) in the index field and including the status information in the response frame, to the master controller 100, by referring to the control message and the status request message.

When the response message from the first slave controller is received, the controller 110 may generate a control message including the controller identification data of a slave controller different from the first slave controller that already transmitted the response message, among the first to third slave controllers. For example, the controller 110 may generate a control message including the controller identification data of the second slave controller.

Accordingly, referring back to FIG. 4, the master controller 100 may transmit a control message (①) including controller identification data (2) of the second slave controller in the index field, to each of the slave controllers 200. Furthermore, the master controller 100 may transmit a status request message (②) requesting status information of a slave controller to each of the slave controllers 200.

The second slave controller may transmit a response message (③) including the controller identification data (2) in the index field and including the status information in the response frame, to the master controller 100, by referring to the control message and the status request message.

When the response message from the second slave controller is received, the controller 110 may generate a control message including the controller identification data of the third slave controller different from the first and second slave controllers that already transmitted the response messages, among the first to third slave controllers. Since the process of receiving a response message from the third slave controller is the same as the description presented as above, the description about the process is omitted.

As described above, according to the present disclosure, the collision of responses of the slave controllers may be prevented by sequentially receiving the response messages from the respective slave controllers.

When the receiver 130 receives all response messages from the slave controllers 200, the controller 110 according to the embodiment of the present disclosure may generate again a control message including the controller identification data of the response slave controller.

In detail, when the master controller 100 receives all response messages from all of the slave controllers 200, the controller 110 included in the master controller 100 according to the embodiment of the present disclosure may generate again a control message including the controller identification data of the first response slave controller.

Referring back to FIG. 4, the master controller 100 may receive all response messages from all of the slave controllers 200, by receiving a response message from the third slave controller. At this time, the controller 110 may generate again the control message including the controller identification data of the first response slave controller, that is, the first slave controller.

Accordingly, the master controller 100 may sequentially receive the status information of the respective slave controllers, according to the time schedule including transmission of the control message and the status request message and the receiving of the response message. Furthermore, even when the status information of all slave controllers are received, the receiving of the status information of each slave controller may be repeated from the first.

As described above, according to the present disclosure, the status of the slave controllers may be continuously monitored by repeating the receiving of a response message with respect to each slave controller when the response messages from all slave controllers are received.

Figure 5:
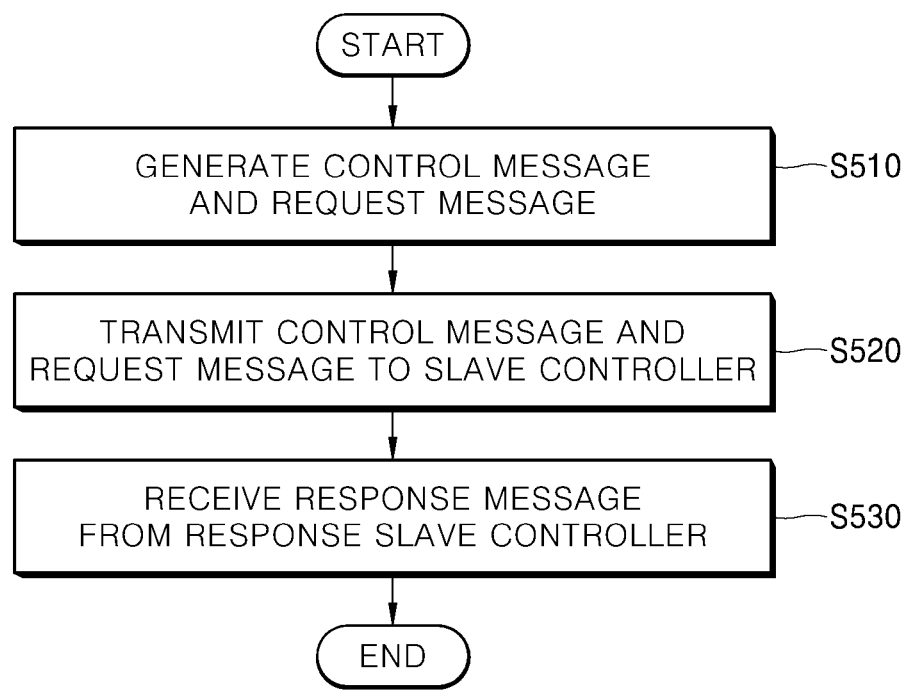
FIG. 5 is a flowchart of a method of controlling an operation of a slave controller, according to an embodiment of the present disclosure.

FIG. 5 is a flowchart of a method of controlling an operation of a slave controller, according to an embodiment of the present disclosure. A method of controlling the operations of one or more slave controllers connected via the LIN communication is described below in detail with reference to FIG. 5.

Each of the operations in FIG. 5 may be performed by the master controller 100 illustrated in FIG. 2. Since the master controller 100 is described above with reference to FIGS. 2 and 4, a detailed description thereof is omitted.

Referring to FIG. 5, the master controller generates a control message to control the operations of the slave controllers and a status request message to request status information of the slave controllers (S510). Next, the master controller transmits the generated control message and status request message to the slave controllers (S520). Next, when the response slave controller generates a response message including status information thereof, by referring to the control message and the status request message, the master controller receives the response message from the response slave controller (S530).

The operation S510 may be the same as the method described regarding the controller 110 of FIG. 1. The operation S520 may be the same as the method described regarding the transmitter 120 of FIG. 1. The operation S530 may be the same as the method described regarding the receiver 130 of FIG. 1.

Figure 6:
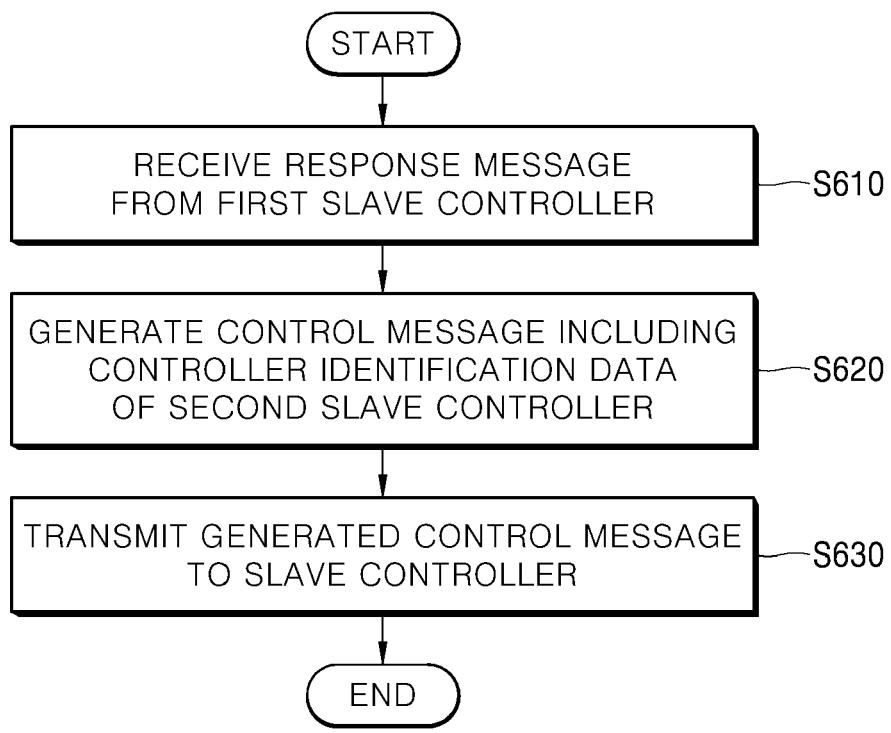
FIG. 6 is a flowchart of a process of transmitting a control message in order to sequentially receive response messages with respect to the slave controllers.

FIG. 6 is a flowchart of a process of transmitting a control message in order to sequentially receive response messages with respect to the slave controllers. A method of sequentially receiving the status information of the respective slave controllers is described below in detail with reference to FIG. 6.

Each of the operations of FIG. 6 may be performed by the master controller 100 illustrated in FIG. 2.

Referring to FIG. 6, when the master controller receives a response message from the first slave controller (S610), the master controller generates a control message including controller identification data of the second slave controller different from the first slave controller (S620). Next, the master controller transmits the generated control message to the slave controllers (S630).

The operation S610 may be the same as the method described regarding the receiver 130 of FIG. 1. The operation S620 may be the same as the method described regarding the controller 110 of FIG. 1. Furthermore, the operation S630 may be the same as the method described regarding the transmitter 120 of FIG. 1.

Figure 7:
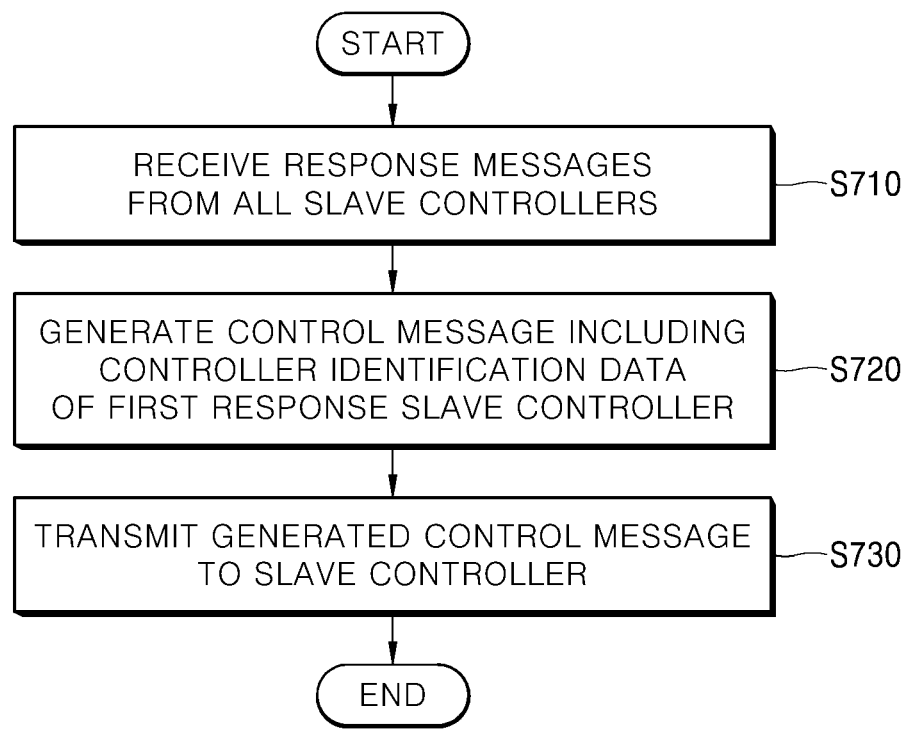
FIG. 7 is a flowchart of a process of repeating the receiving of response messages with respect to the slave controllers.

FIG. 7 is a flowchart of a process of repeating the receiving of response messages with respect to the slave controllers. A method of repeating the receiving of response messages with respect to the slave controllers is described below in detail with reference to FIG. 7.

Each of the operations of FIG. 7 may be performed by the master controller 100 illustrated in FIG. 2.

Referring to FIG. 7, when the master controller receives response messages from all slave controllers (S710), the master controller generates again a control message including controller identification data of the first response slave controller, for example, the first slave controller in FIG. 6 (S720). Next, the master controller transmits again the controlled control message to the slave controllers (S730).

The operation S710 may be the same as the method described regarding the receiver 130 of FIG. 1. The operation S720 may be the same as the method described regarding the controller 110 of FIG. 1. Furthermore, the operation S730 may be the same as the method described regarding the transmitter 120 of FIG. 1.

As described above, according to the present disclosure, the operations of one or more slave controllers connected via a LIN communication may be simultaneously control by transmitting a single control message to control the operations of the slave controllers.

Furthermore, according to the present disclosure, the status information of a slave controller may be selectively received by receiving a response message from a response slave controller corresponding to controller identification data included in a control message.

Furthermore, according to the present disclosure, the collision of responses of slave controllers may be prevented by sequentially receiving the response messages from the respective slave controllers.

Furthermore, according to the present disclosure, the status of the slave controllers may be continuously monitored by repeating the receiving of a response message with respect to each slave controller when the response messages from all slave controllers are received.

The present disclosure described above may be variously substituted, altered, and modified by those skilled in the art to which the present disclosure pertains without departing from the scope and sprit of the present disclosure. Therefore, the present disclosure is not limited to the above-mentioned exemplary embodiments and the accompanying drawings.

What is claimed is:

1. An apparatus for controlling operations of one or more slave controllers connected via a local interconnect network (LIN) communication, the apparatus comprising:
    a controller configured to generate a control message comprising control data including a control command to each of the one or more slave controllers and controller identification data of the response slave controller to control the operations of the one or more slave controllers and a status request message comprising message header data requesting the status information of the one or more slave controllers to request status information of the one or more slave controllers;
    a transmitter configured to transmit the control message and the status request message to the slave controllers; and
    a receiver configured to receive a response message from a response slave controller when the response slave controller included in the one or more slave controllers generates the response message including status information thereof by referring to the control message and status request message,
    wherein the response slave controller generates the response message including status information thereof, by referring to the controller identification data included in the control message and the message header data included in the status request message.

2. The apparatus of claim 1, wherein, when the receiver receives the response message, the controller generates a control message including the controller identification data of the response slave controller different from the response slave controller that transmitted the response message, among the one or more slave controllers.

3. The apparatus of claim 1, wherein, when the receiver receives all response messages from the one or more slave controllers, the controller generates again a control message including the controller identification data of the response slave controller.

4. The apparatus of claim 1, wherein the one or more slave controllers are simultaneously operated according to the control command to each of the one or more slave controllers.

5. The apparatus of claim 1, wherein the control message comprises head frame data and response frame data generated by the apparatus, and the response message comprises response frame data generated by the response slave controller.

6. A method of controlling operations of the one or more slave controllers connected via a local interconnect network (LIN) communication, the method comprising:
    generating a control message comprising control data including a control command to each of the one or more slave controllers and controller identification data of the response slave controller to control the operations of the one or more slave controllers and a status request message comprising message header data requesting the status information of the one or more slave controllers to request status information of the one or more slave controllers;
    transmitting the control message and the status request message to the one or more slave controllers; and
    receiving a response message from a response slave controller when the response slave controller included in the one or more slave controllers generates the response message including status information thereof by referring to the control message and status request message,
    wherein the response slave controller generates the response message including status information thereof by referring to the controller identification data included in the control message and the message header data included in the status request message.

7. The method of claim 6, wherein the generating of the control message to control the one or more slave controllers and the status request message to request status information of the one or more slave controllers comprises:

when the response message is received from the response slave controller, generating a control message including the controller identification data of a response slave controller different from the response slave controller, among the one or more slave controllers.

8. The method of claim 6, wherein the generating of the control message to control the one or more slave controllers and the status request message to request status information of the one or more slave controllers co arises:

when all response messages are received from the one or more slave controllers, generating again a control message including the controller identification data of the response slave controller.

9. The method of claim 6, wherein the one or more slave controllers are simultaneously operated according to the control command to each of the one or more slave controllers.

10. The method of claim 6, wherein the control message comprises header frame data and response frame data generated by the apparatus, and the response message comprises response frame data generated by the response slave controller.

* * * * *